July 23, 1940.  D. A. WALLACE  2,208,651
FOOD TREATING AND DISPENSING APPARATUS
Filed Aug. 3, 1938  2 Sheets-Sheet 1
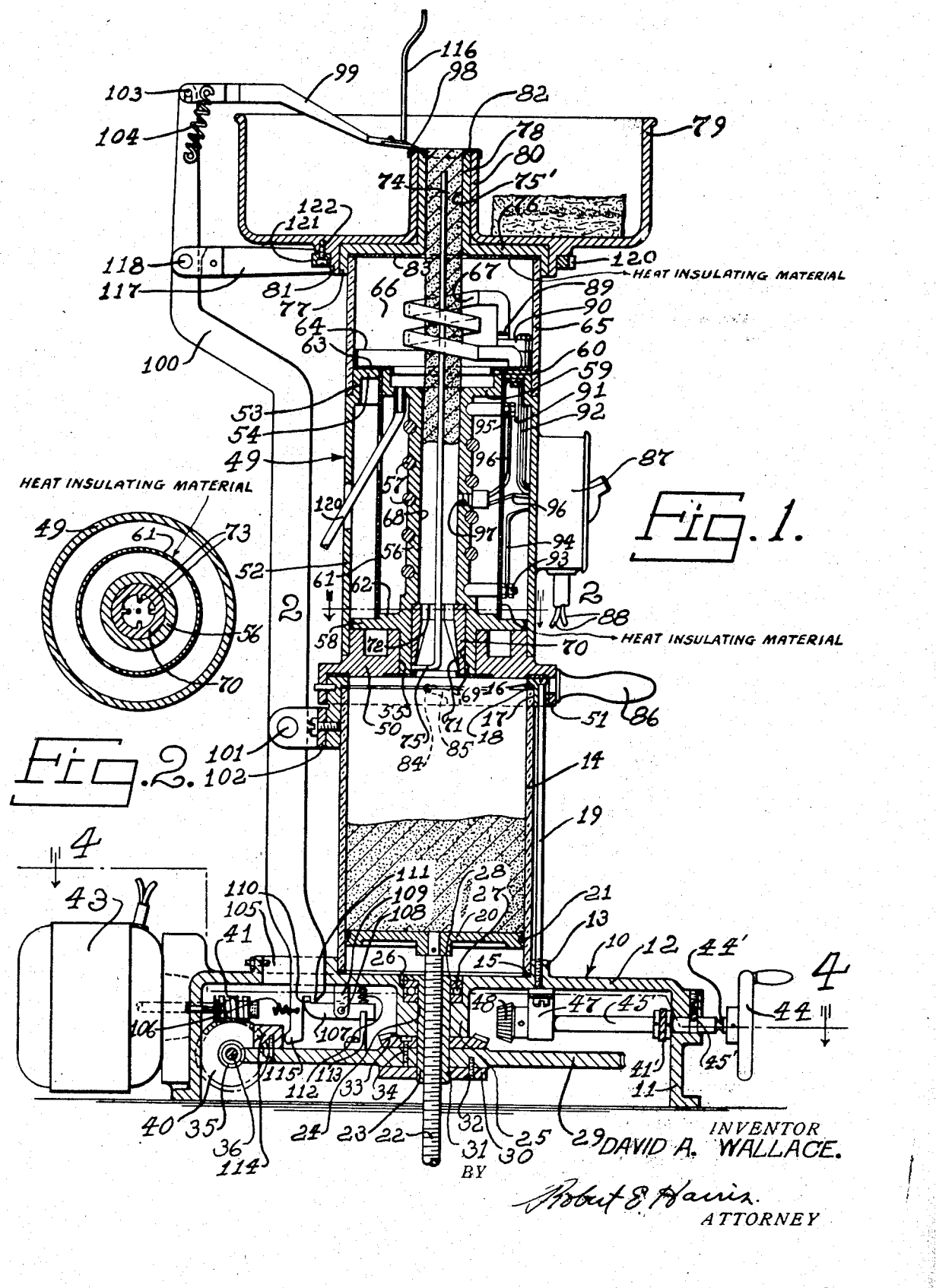
INVENTOR
DAVID A. WALLACE.
BY
Robert E. Harris
ATTORNEY July 23, 1940.  D. A. WALLACE  2,208,651

FOOD TREATING AND DISPENSING APPARATUS

Filed Aug. 3, 1938  2 Sheets-Sheet 2

INVENTOR
DAVID A. WALLACE
BY
Robert E. Harris
ATTORNEY

Patented July 23, 1940

2,208,651

UNITED STATES PATENT OFFICE 2,208,651

FOOD TREATING AND DISPENSING APPARATUS

David A. Wallace, Detroit, Mich., assignor of one-tenth to Gaylord Wallace, Burwell, Nebr.

Application August 3, 1938, Serial No. 222,827

16 Claims. (Cl. 17—32)

This invention relates to an improved combined food preparing and dispensing device.

More particularly the invention relates to improvements in ground meat cooking and dispensing apparatus which is automatic in its operation and adapted to form, cook, cut off and stack uniform lengths of compressed ground meat.

One of the main objects of the invention is the provision in apparatus of this kind of means for progressively advancing a charge of ground meat or meat otherwise reduced to particles of small size through a chamber in which it is boiled in its own juices and through a second chamber where it is broiled to a desired finished state.

Another object of the invention is the provision of means for compressing the ground meat as it is fed into the boiling chamber as to effectively seal the inlet to said chamber against the escapement of the juices in which the meat is boiled.

A further object of the invention is the provision in apparatus of this character of means for so indenting, serrating or fluting the formed meat during compression thereof as to reduce the variations in the distances of diverse portions of the meat from the exterior surface thereof and to increase the area of such surfaces in order to facilitate uniform cooking of the meat throughout its entirety in a comparatively short period of time.

Another object of the invention is the provision of a support extending through the compressing, boiling, broiling and discharging chambers of the apparatus by which ground meat formed to a desired shape is supported in spaced relation to the walls of the boiling and discharge chambers as well as in uniform spaced relation from a surrounding heating element by which the meat is broiled.

Additional objects of the invention are to provide apparatus of this character which can be conveniently disassembled for accommodating cleaning of the various portions thereof and refilling of its food containing hopper; to provide transparent wall structures along portions of the path of travel of the meat to enable enticement of prospective purchasers thereof by visual observation of the meat during certain stages in its treatment; to provide apparatus of this character which can be speedily conditioned for refilling after a charge has been dispensed; to provide apparatus of this kind by which is eliminated the necessity of handling the meat at all stages of its preparation; to provide a heated storage chamber in a machine of this kind for receiving and storing the cooked and cut-off pieces of meat and in which the latter may be kept hot in heated juices of the meat between the time it is discharged and the time it is sold; to provide a movable storage chamber of this kind and means for automatically advancing it intermittently in timed relation to the cutting off of the pieces of meat it receives in order to facilitate stacking of the cut-off pieces in an orderly manner and to provide means for controlling and maintaining the temperature of the broiling and boiling chambers of the apparatus at different predetermined values.

An illustrative embodiment of the invention is shown in the accompanying drawings, in which:

Fig. 1 is a central vertical sectional view of a meat forming and dispensing apparatus embodying the invention.

Fig. 2 is a transverse horizontal sectional view taken on the line 2—2 of Fig. 1.

Figure 3:
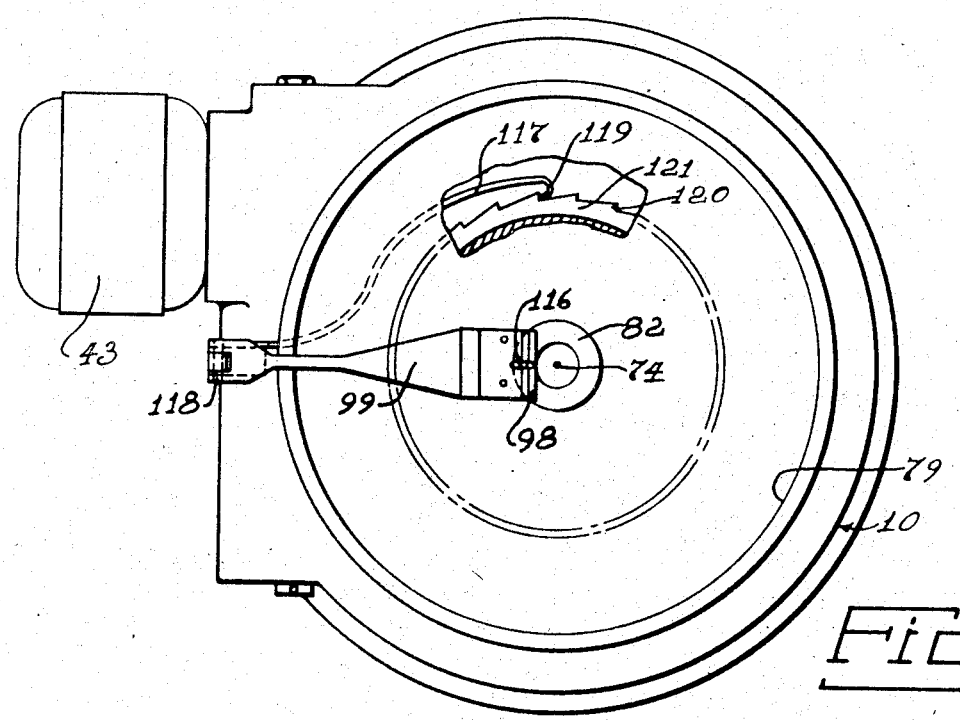
Fig. 3 is a top plan view of the apparatus shown in Fig. 1 with portions thereof broken away to disclose the underlying structure.

In the drawings is illustrated a cooking and dispensing apparatus embodying the invention and which is particularly adapted for preparing and dispensing pieces of meat suitable for use in hamburger sandwiches. The apparatus, however, may be employed for the preparing and dispensing of foods of diverse kinds which are susceptible of compression and extrusion to a desired shape.

The apparatus includes a base structure, generally designated by the numeral 10, which comprises an inverted annular pan-like body portion having a vertically disposed peripheral side wall 11 and a substantially horizontal top wall 12. Formed at the central portion of the top wall 12 is a ring-shaped upstanding flange 13 within which is received a cylinder 14 formed of glass or other suitable transparent material which serves as a hopper for the food, such as ground meat, to be cooked and dispensed by the apparatus. The lower end of the cylinder 14 is seated upon a sealing gasket 15 disposed within the flange 13 and upon the upper wall 12 of the base structure. Mounted on the upper end of the cylinder 14 is a collar 16 having a counterbore 17 in which the upper edge portions of the cylinder 14 are received. A sealing gasket 18 is disposed between the upper extremity of the cylinder 14 and a shoulder of the collar 16 with which it registers.

The cylinder 14 is firmly clamped on the base 10 by a plurality of elongated bolts 19 which extend through apertures in the collar 16 and which are threaded in apertures formed in the flange 13 of the base.

Slidably disposed in the cylinder 14 is a plunger 20 having a grooved periphery closely fitting the internal surface of the cylinder wall in which is fitted a yieldable packing ring 21 for forming a seal between the cylinder and the plunger. The latter is carried by a threaded shaft 22 which is threaded in a sleeve 23 journaled in an aperture 24 formed in a downwardly extending hub portion 25 formed at the center of the top wall of the base. Formed in the upper wall and hub portion 25 is a cylindrical recess 26 which is concentric and communicates with the aperture 24 and in which is disposed a roller thrust bearing unit 27. The sleeve 23 has a radial flange 28 on its upper extremity which is seated upon the thrust bearing unit 27. Rotation of the sleeve 23 relative to the shaft 22 urges the latter in the direction of its axis.

The sleeve 23 may be drivingly rotated by a worm gear 29 which is non-rotatably fixed thereto by a collar 30 mounted on the lower extremity of the sleeve and pinned thereto at 31, the collar 30 being detachably secured to the hub portion of the gear 29 by screws 32. A bevel gear 33 is interposed between the lower extremity of the hub portion 25 of the base and the upper side of the hub portion of the worm gear 29 and detachably secured to the latter by bolts 34.

The teeth of the worm gear 29 are meshed with a worm 35 non-rotatably mounted on a substantially horizontally extending shaft 36 which has a ball 34 at one end rotatably and universally supported in a ball socket 38 provided in the side wall structure of the base 10. The opposite end of the shaft 36 is journaled in a bearing element 39 which is slidably mounted in a slot 38' formed in an extension of the side wall of the base structure.

The worm 35 is releasably held in engagement with the teeth of the worm gear 29 by an arcuate lever 39' having one end pivotally attached at 40' to the bearing element 39. When the worm 35 is in mesh with the gear 29 the latter may be driven in a clockwise direction, as viewed in Fig. 4, by a motor 43 having a shaft 42 on which is provided a worm 41 meshed with a worm gear 40 on the shaft 36. This clockwise rotation of the gear 29 may be relied upon to urge the shaft 22 and plunger 20 upwardly to displace food from the hopper 14 for treatment, hereinafter described.

The opposite end of the lever 39' has a ring 41' in which is received a shaft 45 journaled and axially slidable in bearings 46 and 47 carried by the side and top walls respectively of the base. The shaft 45 extends internally of the base structure 10 to its central portion and on the inner end of this shaft a bevel pinion 48 is fixed. The outer end of shaft 45 is provided with spaced grooves 43' and 44' in which a spring depressed detent 45' is selectively receivable. The ring 41' of the lever 39' is held against movement axially relative to the shaft 45 by a pair of collars 46'.

Figure 4:
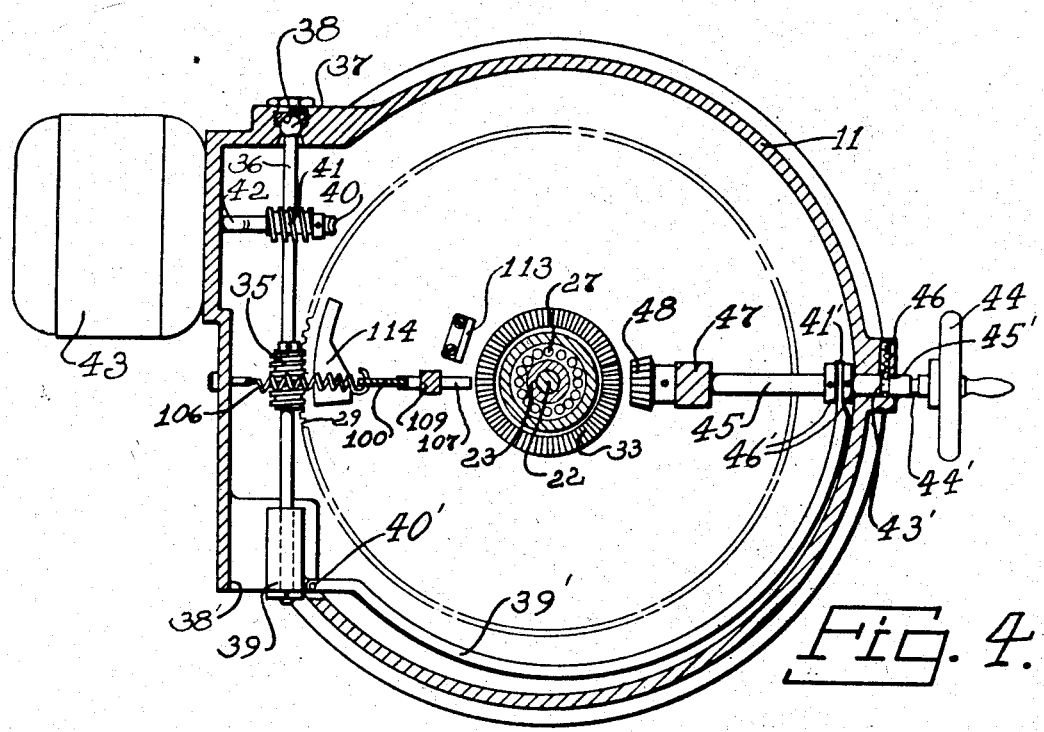
Fig. 4 is a transverse horizontal sectional view taken on the line 4—4 of Fig. 1.

When the shaft 45 is shifted inwardly in the direction of its axis until the detent 45' engages in the groove 44', the bevel pinion 48 is meshed with the bevel gear 33 by which the worm gear 29 may be rotated in a counter-clockwise direction, as viewed in Fig. 4. Such inward movement of the shaft 45 disengages the worm 35 from the worm gear 29 by pivoting the shaft 36 about its ball end 37 through the action of the lever 39'. This setting of the gear mechanism accommodates free counter-clockwise rotation of the gear 29 to urge the shaft 22 and plunger 20 downwardly for conditioning the hopper 14 for refilling. When the shaft 45 is shifted outwardly, as viewed in Fig. 4, until the detent 45' is engaged in the groove 43', the pinion 48 is disengaged from the gear 33 and the worm 35 is urged into mesh with the gear 29 by the action of the lever 39' on the shaft 36. Thus the plunger driving mechanism can be conveniently conditioned to drivingly move the plunger through its food discharging stroke and for manual return of the plunger to accommodate refilling of the hopper in which it operates.

The collar 16 on the upper end of the cylinder 14 detachably supports boiling, broiling, discharging and storing sections. The boiling section, generally designated by the numeral 49, has a lower metal base portion 50 comprising a body portion extending transversely of the upper end of the cylinder 14 and a downwardly extending peripheral flange 51 in which the collar 16 is received. Mounted on a seat formed on the outer edge portion of the body part 50 of the base of the boiling section is a metal cylinder 52 having a reduced upper end section 53 and an inwardly extending flange 54 at its upper end. The base portion 50 of the boiling section 49 is provided with a central bore 55 in which is mounted the lower end portion of a hollow cylindrical metal boiling tube 56 around which is coiled an electric heating element 57. The boiling tube preferably comprises a Calrod or other suitable heating unit. The metal tube 56 has an outwardly extending radial flange 58 which is seated upon the upper surface of the body portion of the base of the boiling section. Formed at the upper end of the metal tube 56 is an outwardly extending radial flange portion 59 having a relatively short axial flange 60 received within the radial flange 54 of the cylinder 52. Disposed between the inner edge portions 54 of the cylinder and the periphery of the axial flange 60 of the metal tube 56 is a heat insulating cylinder 61 comprising heat insulating material. The insulating cylinder 61 surrounds the boiling tube 56 and has a lower end portion within which is fitted a boss 62 formed on the upper side of the flange 58 of the tube 56. The flanges 54 and 60 of the cylinder 49 and metal tube 56 terminate in a common horizontal plane and they are covered by a cap 63 having a lip portion extending over the flange 60 of the tube 56 and an annular flange 64 which is flush with the reduced end portion 53 of the cylinder 52.

Mounted on the reduced end portion 53 of the cylinder 52 is a cylinder 65 which preferably comprises glass, Pyrex or other suitable heat resisting and transparent material. Within the cylinder 65 is provided a broiling chamber 66 in which is disposed an electric heating coil 67 concentrically located with respect to the central passage 68 of the boiling tube 56. Formed in the lower end of the boiling tube 56 is a counterbore 69 which is concentric with the passage 68 but of somewhat larger diameter than the latter passage. A food forming and compressing collar 70 is fitted in the counterbore 69 and provided with an upwardly tapering end portion 71 which communicates with the interior of the discharge hopper provided by the cylinder 14. The upper end portion 72 of the collar 70 is of smaller crossbase structure 10. The latch bar 107 has a flange 110 which is normally held in engagement with an abutment 111 on the lever 100 by the action of a spring 112 which normally urges the bar 107 in a clockwise direction, as viewed in Fig. 1, about its pivotal axis. The latch bar 107 is automatically released once during each complete rotation of the worm gear 29 by an abutment 113 mounted thereon having an upper cam surface which strikes the latch bar and rotates it in a counter-clockwise direction, as viewed in Fig. 1. Immediately after the latch bar has been released to permit clockwise rotation of the lever 100 about its axis 101 and to cause rightward movement of the knife blade 98 across the outlet of the discharge passage 75, the lever 100 and knife blade 98 are restored to their normal positions by a cam member 114 mounted on the worm gear 29 which abuts against a projection 115 on the lower extremity of the lever as the gear wheel proceeds to rotate. The cut off mechanism is thus operated in timed relationship to the discharge of food from the apparatus so as to cut the food into uniform lengths. The length of each piece of food may be varied for a given volume of food by restricting or enlarging the passage in the forming die or collar 70. A change in the volume of food in each piece may be made by varying the ratio of the gearing by which the plunger 20 is operated or the thread on the shaft 22 which moves the plunger.

Mounted on the lever 99 adjacent the knife blade 98 is an upstanding wire 116 which tips each piece of food over, after it is cut, into the receptacle 79. The latter is automatically rotated intermittently after each successive piece of food is cut off by a spring arm 117 pivotally attached at 118 to the upper end portion of the lever 100. The arm 117 has a hook 119 on its free extremity which is yieldably urged against ratchet teeth 120 provided on a ring 121 which is mounted on the lower side of the receptacle 79 by screws 122. Each time the upper end of the lever 100 moves leftwardly, as viewed in Fig. 2, the spring arm 117 advances the receptacle 79 a distance corresponding to one tooth 120 thereby indexing the receptacle about its axis to facilitate orderly stacking of the pieces of food therein. When hamburger is prepared in the apparatus a quantity of meat juice or other suitable liquid may be provided in the receptacle and kept hot by the heat of the broiling chamber 66.

When cooking and dispensing ground meat and other foods with the foregoing apparatus the formed column of food is held by the guide rod 74 in spaced relation to the walls of the boiling tube to permit free access of boiling liquid containing meat juices, seasoning, butter and any other ingredients which may be added to or mixed with the charge of food in the hopper 14, to the entire exterior of the column of meat. Excess liquid boiling over from the tube 56 may be drained from the apparatus by a drain tube 120 communicating with the upper end of the tube 56. The provision of serrations or indentations in the column of food by the fins 73 of the forming die 70 facilitates uniform cooking of all portions thereof in both the boiling and broiling chambers. Food prepared by this apparatus need not be handled by an attendant at any stage in its preparation. The transparent walls of the various portions of the apparatus accommodate observation of certain parts of the cooking and discharging treatment. All portions of the apparatus can be conveniently disassembled and the cutter blade arm 99 can be readily rotated out of the way to accommodate disassembling and cleaning of diverse portions of the device.

Although but one specific embodiment of the invention is herein shown and described, it will be understood that various changes in the size, shape and arrangement of parts may be made without departing from the spirit of the invention.

What I claim is:

1. Meat preparing apparatus including means for continuously forming and discharging a charge of ground meat in an elongated patty of predetermined cross-section, and boiling and broiling units arranged in series relationship adjacent the outlet of said forming and discharging means with said boiling unit between said outlet and said broiling unit for initially boiling and subsequently broiling successively adjacent portions of said charge of ground meat as the latter is discharged from said forming and discharging means.

2. Meat preparing apparatus including means for continuously forming and discharging a charge of ground meat in an elongated patty of predetermined cross-section, boiling and broiling units arranged in series relationship adjacent the outlet of said forming and discharging means with said boiling unit between said outlet and said broiling unit for initially boiling and subsequently broiling successively adjacent portions of said charge of ground meat as the latter is discharged from said forming and discharging means, means providing an outlet passage for said discharged meat adjacent the end of said broiling unit remote from said boiling unit, and mechanism for cutting said discharged meat into pieces of predetermined lengths after broiling thereof.

3. Meat preparing apparatus including means for continuously forming and discharging a charge of ground meat in an elongated patty of predetermined cross-section, boiling and broiling units arranged in series relationship adjacent the outlet of said forming and discharging means with said boiling unit between said outlet and said broiling unit for initially boiling and subsequently broiling successively adjacent portions of said charge of ground meat as the latter is discharged from said forming and discharging means, means providing an outlet passage for said discharged meat adjacent the end of said broiling unit remote from said boiling unit, mechanism operable in timed relationship with respect to said forming and discharging means for cutting said discharged meat into pieces of predetermined uniform lengths after broiling thereof, and a storage receptacle adjacent said broiling unit adapted to be heated thereby for receiving cut-off pieces of meat.

4. Meat preparing apparatus including means for continuously forming and discharging a charge of ground meat in an elongated hollow patty of predetermined cross-section, boiling and broiling units arranged in series relationship adjacent the outlet of said forming and discharging means with said boiling unit between said outlet and said broiling unit for initially boiling and subsequently broiling successively adjacent portions of said charge of ground meat as the latter is discharged from said forming and discharging means, and a central support member extending through said boiling and broiling units adapted to extend through the interior of the hollow elongated discharge from said means for holding the sectional area than that of the passage 68 of the boiling tube 56. The upper end portion 72 predetermines the size of the food discharged from the hopper 14 preferably to such dimensions that the food will not contact with the side walls of the bore 68. The outlet end portion 72 of the forming collar 70 is preferably provided with arcuately spaced ridges, illustrated at 73 in Fig. 2, which form the exterior of the meat to a desired fluted, serrated or other irregular character in order to provide grooves in the exterior of the food as it is discharged from the hopper 14 and so as to facilitate access of the boiling juices or other liquid to innermost portions of the food. A rod 74 extends from the lower end portion of the forming and compressing collar 70 centrally through the bore 68, boiling coil 67 and beyond the broiling chamber 66. The lower end of the rod 74 has a section 75 disposed transversely of the inlet end of the collar 70 and secured to the lower end portion of the tube 56. During discharging of meat or other food from the cylinder 14, the food is compressed in the tapered portion of the collar 70 and formed around the rod 74 in a compact mass having sufficient density to effectively seal the lower end of the bore 68 of the boiling tube 56 against the escapement of liquid from the interior of the latter. The rod 74 supports the compressed and formed food as the latter is progressively moved through the bore 68 of the boiling tube, broiling chamber 66 and through the discharge passage 75' of the device, hereinafter more clearly described, thereby holding the compressed and formed elongated column of food in spaced relation to the wall of the bore 68 and the heating coil in the broiling chamber 66. Upward movement of the plunger 20 is predetermined to discharge contents of the cylinder 14 at a rate which is calibrated to progressively expose successively adjacent portions of the continuous column of food to the boiling and broiling treatments for a sufficient length of time to thoroughly cook the food throughout and to brown and broil its external portions to a desired depth. For boiling and broiling hamburger, the temperature within the boiling tube 56 is preferably maintained at from 170° to 260° F. and the temperature within the broiling chamber 66 is maintained between 1200° F. and 1600° F. This temperature is sufficiently high to dry off, bake, broil and sear the exterior surfaces of the column of meat passing through the broiling chamber.

Mounted on the upper end of the cylinder 65 is a closure 76 having a peripheral flange 77 surrounding the upper edge portions of the cylinder 65 and having a centrally located discharge tube 78 providing the discharge passage 75'. Journaled on the closure 76 is a receiving receptacle 79 having a central hollow hub portion 80 through which the discharge tube 78 extends. The receptacle 79 has a downwardly extending annular flange 81 within which the flange 77 of the closure 76 is received. A sheet metal cap 82 is provided on the upper extremities of the discharge tube 78 and hollow hub portion 80 which terminate in substantially the same horizontal plane. The receiving hopper 79 is adapted to be heated by the heat of the broiling chamber 66. This heating action may be predetermined by interposing a suitable gasket 83 comprising asbestos or other suitable insulating material between the closure 76 and the upper extremity of the cylinder 65.

The closure and receptacle 76 and 79 respectively, as well as the cylinders 65, 52 and 61, may be conveniently disassembled from the apparatus by moving them vertically upwardly as viewed in Fig. 1. The base portion 50 of the boiling section 49 is detachably secured to the collar 16 of the cylinder 14 by a bayonet joint connection comprising spaced pins 84 fixed to the collar 16 and extending outwardly therefrom which are received in bayonet slots 85 formed in the flange 51 of the base part of the boiling section 49. The flange 51 is provided with a suitable handle 86 by which the boiling section and all parts of the apparatus mounted thereon may be conveniently rotated to connect and disconnect the bayonet joint elements. This detachable connection between the discharge hopper and the boiling section 49 of the apparatus facilitates convenient removal of the latter to accommodate refilling of the hopper.

The electric heating elements 67 and 57 are included in circuits comprising switch mechanism 87 to which current is supplied by line wires 88. One terminal 89 of the heating element 67 is connected to one terminal of a thermostatic switch 90 located in the broiling chamber 66 and the other terminal of the heating element 67 is connected with the switch mechanism by a conductor 91. A conductor 92 connects the switch mechanism with the other terminal of the thermostatic switch 90. The terminal 93 of the heating element 57 is connected with the switch mechanism by a conductor 94 and the other terminal 95 thereof is connected with the switch mechanism 87 by conductor 96 in which a thermostatic switch 97 is connected in series. The thermostatic switch 97 is located in an aperture formed in the wall of the boiling tube 56 and is responsive to the temperature therein.

This apparatus automatically controls excitation of the heating elements 57 and 67 so as to maintain predetermined different boiling and broiling temperatures in the respective chambers of the apparatus, the switch mechanism 87 being manually controllable to render the heating circuits operative and inoperative selectively.

Food discharged from the hopper comprising the cylinder 14 is continuously fed through the discharge passage 75'. The food thus discharged is cut into predetermined lengths by cutting mechanism comprising a knife blade 98 carried by an arm 99 which is adapted to slide upon the cap 82 across the outlet end of the discharge passage.

The arm 99 and cutter blade are operated in timed relationship with respect to movement of food through the discharge passage 75' under the action of the plunger 20, by a lever 100 extending from a location above the receiving chamber 79 through an aperture 105 in the top wall of the main base structure 10 of the apparatus. The lever 100 is pivotally mounted at 101 on a bracket 102 carried by the collar 16 of the discharge hopper. The upper end portion of the lever 100 and the outer end portion of the lever 99 are detachably pivotally connected together at 103 by a pin and slot connection and the lever 99 is yieldably urged downwardly about the pin and slot connection by a coil spring 104.

The lower end portion of the lever 100 is resiliently urged leftwardly, as viewed in Fig. 1, about its pivotal axis 101 by a coil spring 106 attached at one end of the lever and at its other end to the side wall of the base structure. The lower end portion of the lever 100 is releasably held against such leftward movement by a latch bar 107 pivotally mounted at 108 on a bracket 109 extending downwardly from the top wall of the latter against engagement with surfaces of said boiling and broiling units during passage of said discharge therethrough.

5. Meat preparing apparatus including means for continuously forming and discharging a charge of ground meat in an elongated hollow patty of predetermined cross-section, boiling and broiling units arranged in series relationship adjacent the outlet of said forming and discharging means with said boiling unit between said outlet and said broiling unit for initially boiling and subsequently broiling successively adjacent portions of said charge of ground meat as the latter is discharged from said forming and discharging means, means providing an outlet passage for said discharged meat adjacent the end of said broiling unit remote from said boiling unit, and a support extending through said boiling and broiling units and through said outlet passage in spaced relation to the surfaces thereof for holding meat discharged against engagement with surfaces of said boiling and broiling units, said forming and discharging means being adapted to compress ground meat about said support and urge the same longitudinally thereof.

6. Food preparing and dispensing apparatus including a base structure, a food hopper on said base structure having an outlet opening, means in said hopper for displacing food therefrom, means providing a passageway having an inlet communicating with said outlet, an element for heating the interior of said passageway to a food boiling temperature, a member in the inlet of said passageway adjacent said hopper outlet for compressing food displaced from said hopper to smaller cross-sectional dimensions than those of said passageway and for densifying food at the inlet of said passageway to seal the latter against escapement of food juices from its interior, and mechanism for operating said food displacing means to progressively move food from said hopper through said passageway and to subject successively adjacent portions thereof to a boiling treatment therein.

7. Food preparing and dispensing apparatus including a base structure, a food hopper on said base structure having an outlet opening, means in said hopper for displacing food therefrom, means providing a passageway having an inlet communicating with said outlet, an element for heating the interior of said passageway to a food boiling temperature, a member in the inlet of said passageway adjacent said hopper outlet for compressing food displaced from said hopper to smaller cross-sectional dimensions than those of said passageway and for densifying food at the inlet of said passageway to seal the latter against escapement of food juices from its interior, a chamber at the end of said passageway opposite from said inlet opening having an element therein for heating its interior to a broiling temperature, and mechanism for operating said food dispensing means to progressively move food displaced from said hopper through the zones of boiling and broiling temperatures of said passageway and chamber respectively at a predetermined rate suitable to accommodate boiling and subsequent broiling of successively adjacent portions of the food displaced from said hopper.

8. Food preparing and dispensing apparatus including a base structure, a food hopper on said base structure having an outlet opening, means in said hopper for displacing food therefrom, means providing a passageway having an inlet communicating with said outlet, an element for heating the interior of said passageway to a food boiling temperature, a member in the inlet of said passageway adjacent said hopper outlet for compressing food displaced from said hopper to smaller cross-sectional dimensions than those of said passageway and for densifying food at the inlet of said passageway to seal the latter against escapement of food juices from its interior, a chamber at the end of said passageway opposite from said inlet opening having an element therein for heating its interior to a broiling temperature, and mechanism for operating said food dispensing means to progressively move food displaced from said hopper through the zones of boiling and broiling temperatures of said passageway and chamber respectively at a predetermined rate suitable to accommodate boiling and subsequent broiling of successively adjacent portions of the food displaced from said hopper, the walls of said chamber and passageway comprising transparent material for accommodating observations of the actions of said food taking place therein.

9. Food preparing and dispensing apparatus including a base structure, a food hopper on said base structure having an outlet opening, means in said hopper for displacing food therefrom, means providing a passageway having an inlet communicating with said outlet, an element for heating the interior of said passageway to a food boiling temperature, a member in the inlet of said passageway adjacent said hopper outlet for compressing food displaced from said hopper to smaller cross-sectional dimensions than those of said passageway and for densifying food at the inlet of said passageway to seal the latter against escapement of food juices from its interior, a chamber at the end of said passageway opposite from said inlet opening having an element therein for heating its interior to a broiling temperature, an outlet tube extending from and communicating with said chamber, mechanism for operating said food displacing means to progressively move food displaced from said hopper through the zones of boiling and broiling temperatures of said passageway, chamber and outlet tube respectively at a predetermined rate suitable to accommodate boiling and subsequent broiling of successively adjacent portions of the food displaced from said hopper, and mechanism for cutting the food into pieces of predetermined length as it emerges from said outlet tube, said cutting mechanism including a knife member and members for actuating the latter adapted to be operated by the operating mechanism of said food displacing means.

10. Food treating and dispensing apparatus including a base structure, a food hopper on said base structure having an outlet opening, means providing a passageway communicating with said outlet opening in which to treat food, means in said hopper for displacing food therefrom and moving the same in a column-like formation through said treating passageway, a rod disposed in and extending from said outlet opening longitudinally of said passageway, and means surrounding the end portion of said rod adjacent said hopper outlet for compressing food discharged from said hopper inwardly around said rod to cross-sectional dimensions of smaller value than those of said passageway, said compressing means including a member having a serrated opening therein for accommodating the movement of said food therethrough and for forming grooves in the exterior of the resulting compressed column-like formation to accommodate access of treatment to interior portions thereof and said rod being adapted to support and hold said compressed food in spaced relation to the walls of said passageway during movement of said food therethrough.

11. Food treating and dispensing apparatus including a base structure, a food hopper on said base structure having an outlet opening, means adjacent said outlet opening providing a passageway in which to treat food, an outlet tube communicating with said passageway, a receiving hopper surrounding said tube and rotatable relative thereto, means in said hopper for displacing food therefrom and moving the same in column-like formation through said treating passageway and said outlet tube, and cutting mechanism including a knife member adjacent said outlet tube and members for actuating said knife member, a common drive for actuating said knife actuating members and said food displacing means in timed relationship.

12. Food treating and dispensing apparatus including a base structure, a food hopper on said base structure having an outlet opening, means adjacent said outlet opening providing a passageway in which to treat food, an outlet tube communicating with said passageway, a receiving hopper surrounding said tube and rotatable relative thereto, means in said hopper for displacing food therefrom and moving the same in column-like formation through said treating passageway and said outlet tube, cutting mechanism including a knife member adjacent said outlet tube and members for actuating said knife member, a common drive for actuating said knife actuating members and said food displacing means in timed relationship, an element on said cutting mechanism for urging cut-out pieces of food toward said receiving hopper, and mechanism operable by and in timed relationship with respect to said cutting mechanism for indexing said receiving hopper about its axis after each operation of said cutting mechanism.

13. Food treating and dispensing apparatus including a base structure, a discharging hopper mounted on said base structure, a food boiling section removably mounted on said discharging hopper, means detachably securing said discharging hopper and boiling section together, a broiling section removably mounted on said boiling section, said boiling and broiling sections having means therein for boiling and broiling food respectively as the latter is passed therethrough, a closure member removably mounted on said broiling section having an outlet tube for accommodating the passage of food from said broiling chamber, a receiving hopper removably mounted on said closure member adapted to receive food from said outlet tube and to be heated by said broiling section, and a heat insulating gasket between said broiling chamber and said receiving hopper for controlling and predetermining the transmission of heat to the latter.

14. Food treating and dispensing apparatus including a base structure, a discharging hopper mounted on said base structure, a food boiling section removably mounted on said discharging hopper, means detachably securing said discharging hopper and boiling section together, a broiling section removably mounted on said boiling section, said boiling and broiling sections having means therein for boiling and broiling food respectively as the latter is passed therethrough, a closure member removably mounted on said broiling section having an outlet tube for accommodating the passage of food from said broiling chamber, a receiving hopper removably mounted on said closure member adapted to receive food from said outlet tube and to be heated by said broiling section, a heat insulating gasket between said broiling chamber and said receiving hopper for controlling and predetermining the transmission of heat to the latter, and mechanism for displacing food from said discharging hopper including a plunger in the latter and driving members in said base structure for actuating said plunger.

15. Food treating and dispensing apparatus including a base structure, a discharging hopper mounted on said base structure, means providing a food treating passageway communicating with said hopper, a plunger in said hopper for displacing food therefrom and forcing it in column-like formation through said passageway, mechanism for drivingly urging said plunger in a food displacing direction including a motor and means including disengageable transmission members for operatively connecting said motor with said plunger, and manually operable means for urging said plunger in an opposite direction to facilitate refilling thereof, said disengageable transmission members being so constructed and arranged as to interrupt the driving connection between said motor and plunger when said manually operable means is actuated to urge said plunger in said latter direction.

16. Food treating and dispensing apparatus including a base structure, a discharging hopper mounted on said base structure, a food boiling section removably mounted on said discharging hopper, means detachably securing said discharging hopper and boiling section together, a broiling section removably mounted on said boiling section, said boiling and broiling sections having electric heating elements therein for boiling and broiling food respectively as the latter is passed therethrough, a closure member removably mounted on said broiling section having an outlet tube for accommodating the passage of food from said broiling chamber, a receiving hopper removably mounted on said closure member adapted to receive food from said outlet tube and to be heated by said broiling section, a heat insulating gasket between said broiling chamber and said receiving hopper for controlling and predetermining the transmission of heat to the latter, and an electric circuit for energizing each of said heating elements, each circuit including a temperature responsive switch for maintaining the temperatures of said boiling and broiling sections at different predetermined values respectively.

DAVID A. WALLACE.